United States Patent
Peet

(10) Patent No.: US 6,242,084 B1
(45) Date of Patent: Jun. 5, 2001

(54) OPAQUE FILM WITH A CORE LAYER OF METALLOCENE-CATALYZED POLYPROPYLENE

(75) Inventor: Robert G. Peet, Pittsford, NY (US)

(73) Assignee: Mobil Oil Corporation, Fairfax, VA (US)

( * ) Notice: Subject to any disclaimer, the term of this patent is extended or adjusted under 35 U.S.C. 154(b) by 0 days.

(21) Appl. No.: 09/257,629

(22) Filed: Feb. 25, 1999

(51) Int. Cl.[7] ................. B32B 3/26; B32B 27/32
(52) U.S. Cl. .................... 428/318.6; 428/318.8; 428/319.9; 428/910
(58) Field of Search ............... 428/318.6, 318.8, 428/319.9, 910

(56) References Cited

U.S. PATENT DOCUMENTS

| | | |
|---|---|---|
| 4,758,462 * | 7/1988 | Park et al. ................. 428/213 |
| 5,252,384 | 10/1993 | Bothe et al. . |
| 5,529,843 | 6/1996 | Dries et al. . |
| 5,556,920 | 9/1996 | Tanaka et al. . |
| 5,571,619 * | 11/1996 | McAlpin et al. ............. 428/364 |
| 5,955,187 * | 9/1999 | McCormack et al. ......... 428/315.5 |

* cited by examiner

Primary Examiner—Blaine Copenheaver
(74) Attorney, Agent, or Firm—Dennis P. Santini; T. Dean Simmons

(57) ABSTRACT

The invention is directed to an oriented multi-layer film which comprises a voided layer and at least one non-voided layer on at least one surface of the voided layer. In one embodiment, the voided layer comprises a Ziegler-Natta or metallocene-catalyzed substantially isotactic propylene polymer in a polymer matrix with a cavitation initiator. In a second embodiment, the non-voided layer comprises a Ziegler-Natta or metallocene-catalyzed substantially isotactic polypropylene polymer. In a third embodiment, both the voided core layer and at least one non-voided layer comprise a metallocene-catalyzed substantially isotactic polypropylene polymer.

8 Claims, No Drawings

OPAQUE FILM WITH A CORE LAYER OF METALLOCENE-CATALYZED POLYPROPYLENE

FIELD OF THE INVENTION

The invention relates to an opaque biaxially oriented film which contains at least one layer of metallocene-catalyzed substantially isotactic propylene polymer. In one instance, the invention relates to a metallocene-catalyzed substantially isotactic propylene polymer-containing biaxially oriented film in which the metallocene-catalyzed propylene polymer of the core layer contains a strata of voids which renders the film opaque. In other manifestations, the invention relates to a metallocene-catalyzed substantially isotactic propylene polymer-containing biaxially oriented film in which the metallocene-catalyzed propylene polymer layer is on one or both surfaces of a core that contains a strata of voids which render the film opaque. That core polymer can be either a metallocene-catalyzed polymer or a Ziegler-Natta catalyzed polymer.

BACKGROUND OF THE INVENTION

Metallocene catalyzed propylene polymers and copolymers are known to have a low melting temperature, relative to conventional propylene polymers. For this reason, metallocene catalyzed propylene polymers and copolymers have been described as useful as the outer layer heat sealable material of multi-layer films in U.S. Pat. No. 5,468,440 (column 6, lines 32 to 41). Other multi-layer films in which the advantage of an outer layer of metallocene catalyzed propylene polymers are described are found in U.S. Pat. Nos. 5,529,843 and 5,462,807. Although these patents describe multi-layer films in which a skin layer is made from a metallocene catalyzed propylene polymer, the patents are silent on the use of metallocene catalyzed propylene polymers in inner layers of a multi-layer film. U.S. Pat. No. 5,254,394 to Bothe et al., discloses a clear polyolefin film for packaging comprising isotactic polypropylene base layer and a top layer of syndiotactic polypropylene which has high sealed-seam strength and high clarity. The top layer can contain lubricant additives, such as waxes at levels of up to 2% wt. relative to each other.

Opaque polypropylene films are described in U.S. Pat. No. 4,377,616 which teaches an opaque biaxially oriented polymeric film structure of lustrous satin appearance comprising a thermoplastic core matrix having a strata of voids which are created by void-initiating solid particles which are incompatible with the matrix material.

Oriented polypropylene films of the above-disclosed types are used extensively in the packaging of a variety of foods. These are often aimed at applications where it is desired to have as low a water vapor transmission (WVTR) and oxygen transmission ($TO_2$) as possible. Other applications do exist for which these types of film structures are unacceptable. One of these is the wrapping of fresh cleaned and chopped produce, such a lettuce, carrots, celery, etc., from which salads can rapidly be prepared. For these applications, a higher level of WVTR and $TO_2$ is desirable to allow respiration through the package walls, while continuing to maintain package integrity.

The film of the present invention has a WVTR and $TO_2$ that have been increased by the use of novel means, as a way to address this need.

SUMMARY OF THE INVENTION

The invention is directed to an opaque oriented multi-layer film which comprises (a) a core voided layer comprising a substantially isotactic propylene polymer and void-initiating particles which are incompatible with the matrix material; and (b) at least one non-voided layer on at least one surface of core layer. Optionally, there is at least one skin layer on at least one surface of the core layer opposite to the surface having the non-voided layer or on the same surface as the non-voided layer or layers. The film of the present invention can also have at least one heat sealable layer on at least one outer surface of the film. The substantially isotactic propylene polymer of the core or of the non-voided layer or layers, or of both the core and non-voided layer or layers is a metallocene-catalyzed isotactic propylene polymer.

DETAILED DESCRIPTION OF THE INVENTION

Voided Layer

The voided layer has a polymer matrix material within which is located a stratum of voids. From this it is to be understood that the voids are integral to the matrix configuration. The term "stratum" is intended to convey the understanding that there are many voids creating the matrix. The matrix polymer and void initiating particles must be incompatible and this term is used in the sense that the materials are two distinct phases. Essentially spherical void initiating particles constitute a dispersed phase throughout the lower melting polymer which polymer will, ultimately, upon orientation, become a void-filled matrix with the spherical particles positioned somewhere in the voids. The void space occupied by the particle is substantially less than the volume of the void, the population of the voids in the voided matrix being such as to cause a significant degree of opacity. The voids themselves become oriented so that the two major dimensions are aligned in correspondence with the directions of orientation of the polymeric structure. After each void has been formed through the initiation of the described particle, the particle generally contributes little else to the system. This is because its refractive index can be close enough to the matrix material that it makes no contribution to opacity. When this is the case, the opacity is principally a function of the light scattering effect which occurs because of the existence of the voids in the system.

Void initiating particles contemplated include polybutylene terephthalate (PBT), PBT spheres, nylon-6, calcium carbonate, cyclic olefin copolymers, as well as other organic and inorganic materials of suitable melting points that are phase distinct from the polymer matrix material, having a size and quantity sufficient to form voids upon orientation of the extruded matrix material.

It is preferred that the average diameter of the void-initiating particles be from about 0.1 to about 10 microns. These particles may be of any desired shape although it is preferred that they be substantially spherical in shape. This does not mean that every void is the same size. It means that, generally speaking each void tends to be of like shape when like particles are used even though they vary in dimensions. These voids may assume a shape defined by opposed and edge contacting concave disks.

The substantially isotactic propylene matrix polymer can be produced by using Ziegler-Natta or metallocene, preferably metallocene catalysts. The broad molecular weight distribution of substantially Ziegler-Natta catalyzed isotactic propylene matrix polymer gives good operability. The WVTR and $TO_2$ levels of the final product made from Ziegler-Natta catalysts, however, are lower than desired for some applications, such as for the packaging of fresh produce, as described above. The preferred metallocene-catalyzed substantially isotactic propylene polymer can be used as the propylene matrix polymer in the core layer with satisfactory operability. This satisfactory operability is surprising in view of the narrow molecular weight distribution of the metallocene-catalyzed resin. By converting to the use of the metallocene-catalyzed polymer, we have been able to achieve up to about 35% higher WVTR and $TO_2$ levels in the film.

The propylene polymer is substantially isotactic. Metallocene-catalyzed isotactic polypropylenes made developmentally or commercially are EOD 96-21 and EOD 97-09, from Fina Oil and Chemical Co., EXPP-129, from Exxon Chemical Co., and Novalen M, from BASF GmbH., among others. The propylene polymers are usually predominantly comprised of propylene (at least 90% by weight) and have a melting point of about 140° C. or higher, more typically a melting point of 150° C. or higher. The melt flow rate usually ranges from about 0.5 g/10 min. to about 15 g/10 min. at 230° C., more typically about 1.5 g/10 min. to about 4 g/10 min. at 230° C. The melt flow is measured by ASTM 1238D.

The voided layer of the film is of sufficient thickness to provide the desired decrease in light transmission and opacity, as well as a pleasing hand. Preferably, the thickness ranges from about 0. 15 mils to about 1.5 mils, depending on the thickness of the entire film structure.

The propylene polymer is oriented at a temperature higher than its glass transition temperature. In a preferred embodiment, the temperature conditions permit void initiation without void splitting at least to any significant degree. It is believed that because of the comparative sphericity of the void-initiating particles, the voids are closed cells. This means that there is virtually no path open from one surface of the core to the other through which liquid or gas can pass. Virtually eliminating any open channels from one surface of the voided core layer to the other results in a higher level of process operability, and a high degree of light scattering is obtained. It does, however, tend to create a film of lower WVTR and $TO_2$. The invention herein is aimed at rectifying that situation.

As a result of the biaxial orientation of the film structure herein, in addition to opacifying the core layer of the structure, the orientation improves other physical properties of the composite layers, such as flex crack resistance, Elmendorff tear strength, and impact strength. The resulting film can have a rich high quality appearance and excellent opacifying characteristics. This makes the film ideally suited for packaging food products. The film also has attractive utility as a decorative wrap material.

The opacity and low light transmission of the film can be further enhanced by the addition to the core layer of from about 0.5% by weight up to about 15% by weight of opacifying compounds, which are added to the melt mixture of the core layer before extrusion. Opacifying compounds which may be used include iron oxides, carbon black, aluminum, $TiO_2$ and talc.

Non-voided Layer

The non-voided layer or layers of films having a general structure of the type of the present invention have been chosen, in the past, from coextrudable, biaxially orientable film-forming resins known in the art and are suitable for use in the present invention along with the Ziegler-Natta or metallocene-catalyzed substantially isotactic propylene polymer voided core. Homopolymers chosen have typically been standard Ziegler-Natta catalyzed polypropylenes. Typical copolymers are ethylene-propylene copolymers, ethylene-butene-1 copolymers, ethylene-propylene random copolymers, and ethylene-propylene block copolymers. Typical terpolymers are ethylene-propylene-butene-1 terpolymers, and block terpolymers of ethylene, propylene, and butene-1. Blends of any of the foregoing homopolymers, copolymers, and terpolymers are contemplated. The non-voided layer can be isotactic or syndiotactic polypropylene.

Ethylene-propylene-butene-1 random terpolymers appropriate for use in the non-voided layer(s) of the present invention include those containing 1-5 weight percent random ethylene and 10–25 weight percent random butene-1 with the balance being made up of propylene. The amounts of the random ethylene and butene-1 components in these terpolymers are typically in the range of 10–30 weight percent (ethylene plus butene-1) based on the total amount of the terpolymer.

The copolymers and terpolymers typically have a melt flow rate in the range of about 2 to 12 with a density of about 0.9 and a melting point in the range of about 96 to about 135° C.

The outermost layer(s) of the film can also be fabricated from any polymers, copolymers, or terpolymers or blends of homopolymers and blends of copolymer(s) and homopolymer(s) which have heat seal or other desirable properties. Several of the materials identified above are illustrative of heat sealable copolymers which can be used in the present invention.

In one aspect of the invention, the non-voided layer(s) can be derived from polyethylene. The polyethylene can be low density polyethylene (LDPE), linear low density polyethylene (LLDPE), medium density polyethylene (MDPE), or high density polyethylene (HDPE). These ethylene polymers typically have a melt index ranging from about 0.3 to about 5.0. The low density polyethylenes should have a density of about 0.88 to about 0.93 $g/cm^3$. Linear materials may have a density as high as 0.94 $g/cm^3$, often ranging from 0.90 to 0.94 $g/cm^3$, with a melt index of about 1 to about 10. The linear low density polyethylenes may be derived from ethylene together with other higher comonomers such as butene-1, hexene-1 or octene-1. Typically, it is useful to use HDPE for the non-voided layer(s) as it enhances film toughness and imparts tear preference in the transverse direction (TD). HDPE has a density of greater than about 0.941 $g/cm^3$, typically from about 0.955 to about 0.965 $g/cm^3$. High density polyethylene suitable for use as a non-voided layer is described in Bakker, Ed. "The Wiley Encyclopedia of Packaging Technology," pp. 514 to 523 (1986).

Each non-voided layer can range in thickness from about 0.05 mils to about 0.9 mils, preferably from about 0.12 mils to about 0.8 mils.

Primary among the polymers chosen for the non-voided layer(s) has been isotactic polypropylene, produced using Ziegler-Natta catalysts. The choice of this broad molecular weight material with good physical strength properties has provided manufacturing robustness which allows good operability, leading to good production economics, as well as desired final film properties. The Ziegler-Natta catalyzed isotactic polypropylene in this layer does, however, contribute to low WVTR and low $TO_2$ levels in the final film. As described above, these can be detrimental in some applications.

The same metallocene-catalyzed substantially isotactic polypropylene as described above for use in the core layer can also be used for the non-voided layer(s) of the film of the current invention, with satisfactory operability. Again, the satisfactory operability is surprising in light of the narrow molecular weight distribution of the metallocene-catalyzed polymer. Through the use of the metallocene-catalyzed polypropylene, the films of the present invention have about 35% higher WVTR and $TO_2$ levels when compared to the conventional films.

Skin Layers

There can be more than one non-voided layer on each surface of the voided layer. That is, one or more layers can be applied to the exposed surface of the non-voided layer. Films having such a multi-layer structure can be represented, in simplified form, as having a structure "ABCBA" where "C" represents a voided layer, "B" represents a non-voided layer adjacent to the voided layer, and "A" represents a further layer applied to the exposed surface of non-voided layer "B". In such a film structure, the non-voided layer "B" can be referred to as a "tie-layer" or an "intermediate layer". Layers "A" and "B" can be the same or different. Additionally, structures containing more than five layers are contemplated, e.g., seven and nine and more layers are contemplated.

Additives

In order to modify or enhance certain properties of the multi-layer films of the invention for specific end-uses, it is possible for one or more of the layers to contain appropriate additives in effective amounts. Preferred additives include antistatic agents, antiblocking agents, lubricants, stabilizers and/or alicyclic hydrocarbon resins. Such additives are further described in U.S. Pat. No. 5,254,394, which is incorporated herein by reference. It is useful to incorporate additives such as wax, finely divided inorganic antiblock particles, silicone oil, and silicone spheres, such as non-migratory particulate cross linked hydrocarbyl substituted polysiloxane slip agent, exemplified by TOSPEARL which is marketed world-wide by Toshiba Silicone Co., Ltd. and in the United States by General Electric. Examples of alicyclic hydrocarbons which can be employed in the films include terpenes, petroleum resins, styrene resins, and cyclopentadiene resins.

Contemplated finely divided inorganic antiblock materials, referred to above, include Syloid, a synthetic amorphous silica gel, having a composition of 99.7% $SiO_2$; diatomaceous earth having a composition of, for example, 92% $SiO_2$, 3.3% $Al_2O_3$ amd 1.2% $Fe_2O_3$, which has an average particle size of about 5.5 microns, which particles are porous and irregularly shaped; dehydrated kaolin clay (Kaopolite SF) having the composition 55% $SiO_2$, 44% $Al_2O_3$, and 0.4% $Fe_2O_3$, which has an average particle size of about 0.7 microns which particles are thin flat platelets; and synthetic precipitated silicates, Sipernat 44 for example, having a composition of 42% $SiO_2$, 36% $Al_2O_3$, and 22% $NA_2O$, which has an average particle size of about 3–4 microns, which particles are porous and irregularly shaped. The amount of antiblock, typically, ranges from about 0.02% to about 2.0 wt. %, based on the weight of the polymer. Typically, a commercially available intensive mixer, such as those of the Bolling or Banbury type are to be employed in mixing a concentrate of the finely divided inorganic material and the selected polymer until there is a uniform dispersion of the inorganic material in the polymer.

Surface Treatment

One or more of the exposed layers of the multi-layer films of the present invention can be surface-treated to render the films receptive to printing inks, adhesives and/or coatings. The surface treatment can be carried out by any method known in the art such as corona discharge treatment or flame treatment.

Coating

Optionally a coating may be applied to the exposed surface of the outermost layer of the film. Prior to application of the coating material, the film may be surface treated or may be primed with a primer layer. Appropriate coatings contemplated include acrylic coatings such as those described in U.S. Pat. Nos. 3,753,769 and 4,865,908 (incorporated herein by reference), PVDC coatings such as described in U.S. Pat. Nos. 4,214,039; 4,447,494; 4,961,992; 5,019,447 and 5,057,177 (incorporated herein by reference). A vinyl alcohol polymer may also be used as a coating composition such as Vinol 325. Appropriate primer materials are poly(ethylene imine) and epoxy primers.

The upper surface of the film is preferably treated as noted above to increase its surface energy and therefor insure that the coating layer will be strongly adherent thereto thereby reducing the possibility of the coating peeling or being stripped from the film. This treatment can be accomplished employing known techniques, such as, for example, film chlorination, i.e., exposure of the film surface to gaseous chlorine, treatment with oxidizing agents such as a chromic acid, hot air or steam treatment, flame treatment and the like. Although any of these techniques are effectively employed to pretreat the film surface, a particularly desirable method of treatment is the so-called electronic treatment method which comprises exposing the film surface to a high voltage corona discharge while passing the film between a pair of spaced electrodes. After electronic treatment of the film surface, the coating composition is then applied thereto.

The exposed treated or untreated surface of layers (A) and/or (B) can be then coated with the coating compositions, as mentioned above, and/or substrates such as another polymer film or laminate; a metal foil such as aluminum foil; cellulosic webs, e.g. numerous varieties of paper such as corrugated paperboard, craft paper, glassine, carton board; nonwoven tissue, e.g., spunbonded polyolefin fiber, meltblown microfibers, etc. The application may employ a suitable adhesive, e.g., a hot melt adhesive such as low density polyethylene, ethylene-methacrylate copolymer, water-based adhesive such as polyvinylidene chloride latex, and the like.

The extruded film can be stretched in the machine direction, coated with the coating composition and then stretched perpendicularly in the transverse direction. In yet another embodiment, the coating can be carried out after biaxial orientation is completed.

The coating composition should be applied in such amount that there will be deposited upon drying a smooth, evenly distributed layer, generally on the order of from about 0.01 to about 0.2 mil thickness (equivalent to about 0.2 to 3.5 g per 1000 sq. in. of film). In general, the thickness of the applied coating is such that it is sufficient to impart the desired sealability and/or oxygen and/or water vapor barrier characteristics to the resulting film. Generally, the coating comprises 1 to 25 wt %, preferably 7 to 15 wt % of the entire coated film composition. The coating on the film is subsequently dried by hot air, radiant heat or by any other convenient means.

There are many advantages to the film of the invention. However, most notable is the advantageous barrier properties.

Usually the film of the invention has a total thickness ranging from about 0.5 mils to about 2.5 mils, specifically from about 0.7 mils to about 2.0 mils. The thickness relationship of the layers can be important. In particular, the voided layer is a relatively thick layer which constitutes about 20% to about 70% percent of the total film thickness, the intermediate layer is of a thickness ranging from about 5% to about 40% of the total film thickness while any outer skin layer might range from about 1% to about 7% of the total film thickness.

Multi-layer films were prepared employing commercially available systems for coextrusion.

The polymers are brought to the molten state and coextruded from a conventional extruder through a flat sheet die, the melt streams may be combined in an adapter prior to being extruded from the die or combined within a die having properly designed cavities. After leaving the die orifice, the multi-layer film is chilled and the quenched sheet is reheated and oriented.

The film is oriented by biaxially stretching the film. The film can be oriented by stretching from about 3.5 to about 6.5 times in the machine direction (MD) at temperatures ranging from about 230° F. to about 295° F. and from about 6 to about 12 times in the transverse direction (TD) at temperatures ranging from about 305 ° F. to about 335° F. In each of the following examples the film was oriented about 4.5 times in the MD at a temperature of about 260° F. and about 8 times in the TD at a temperature of about 320° F.

Physical properties of films made in accordance with this invention are given in the following examples. The films were all made using the method described above.

EXAMPLES

The following examples illustrate the present invention. Example 1 below is a comparative example illustrating the light transmission and barrier properties of the prior art films. Example 2 shows the benefits in lower gloss and higher barrier values when the Ziegler-Natta catalyzed propylene polymer is replaced by a metallocene catalyzed propylene polymer. Example 3 shows the benefit of switching the tie layers from the Ziegler-Natta catalyzed propylene polymer to the metallocene-catalyzed propylene polymer.

Example 1

Comparative Example

A white film was made using Ziegler-Natta catalyzed isotactic propylene polymer (Exxon 4612E2) as the matrix polymer along with 5% polybutylene terephthalate (PBT) as a cavitation initiator in a voided core, along with tie layers and skin layers of the same Exxon 4612E2 polypropylene. The cavitated core was about 1.2 mils thick and the total film thickness was about 1.5 mils.

The light transmission was 24.5%, the WVTR was 0.48, and the $TO_2$ was 148.3.

Example 2

Film of Present Invention

A second white film was made under the same conditions, using metallocene-catalyzed isotactic polypropylene polymer (Fina EOD 96-12) as the matrix polymer along with 8% PBT as a cavitation initiator in a voided core, along with the tie layers and skin layers of Exxon 4612E2 polypropylene, made using Ziegler-Natta catalysts. The cavitated core was again about 1.2 mils thick and the total film thickness was about 1.5 mils.

The light transmission was 26.4%, the WVTR was 0.65, and the $TO_2$ was 199.4.

Example 3

Film of Present Invention

A third white film was made under the same condition using a Ziegler-Natta catalyzed isotactic propylene polymer (Exxon 4612E2) as the matrix polymer along with 6% PBT as a cavitation initiator in a voided core, along with skin layers of this same polymer. The intermediate or tie layers were a metallocene-catalyzed isotactic polypropylene (Fina EOD 96-12). The cavitated core was about 1.1 mils thick and the total film thickness was about 1.5 mils.

The light transmission was 26.3%, the WVTR was 0.53, and the $TO_2$ was 161.4.

While there have been described what are presently believed to be the preferred embodiments of the invention, those skilled in the art will realize that various changes and modifications may be made to the invention without departing from the spirit of such invention. All such changes and modifications which fall within the scope of the invention are therefore intended to be claimed.

What is claimed is:

1. An oriented multi-layer film which comprises:
    (a) (i) a voided layer comprising a metallocene-catalyzed substantially isotactic polypropylene polymer in a matrix with a cavitation initiator; (ii) at least one non-voided layer comprising a Ziegler-Natta catalyzed isotactic polypropylene polymer on at least one side of the voided layer; or
    (b) (i) a voided layer comprising a Ziegler-Natta catalyzed isotactic polypropylene polymer in a matrix with a cavitation initiator; (ii) at least one non-voided layer on at least one side of the voided layer comprising a metallocene-catalyzed polypropylene; or
    (c) (i) a voided layer comprising a metallocene-catalyzed substantially isotactic propylene polymer in a matrix with a cavitation initiator; (ii) at least one non-voided layer on at least one side of the voided layer comprising a metallocene-catalyzed polypropylene,
    wherein the WVTR value of the oriented multi-layer film is from about 0.5 to about 0.7 g-mil/100 in$^2$-day and the $TO_2$ value of the film is from about 160 to about 200 cc mil/100 in$^2$-day.

2. The oriented multi-layer film of claim 1 in which said non-voided layer is substantially isotactic polypropylene or a substantially syndiotactic polypropylene.

3. The oriented multi-layer film of claim 1 in which said non-voided layer comprises a polymer selected from the group consisting of homo-, co-, and terpolymer containing ethylene, propylene, and/or butylene.

4. The oriented multi-layer film of claim 1 in which said non-voided layer comprises a polymer selected from the group consisting of ethylene-propylene copolymer, ethylene-butene 1 copolymer, polyethylene, high density polyethylene (HDPE), ethylene-propylene block copolymer, and ethylene-propylene-butylene terpolymer.

5. The oriented multi-layer film of claim 1 in which at least one of the voided layer and non-voided layer comprises an alicyclic hydrocarbon.

6. The oriented film of claim 1 in which both of the voided layer and non-voided layer(s) are metallocene-catalyzed substantially propylene polymer.

7. The oriented multi-layer film of claim 1, further comprising a skin layer on the exposed surface of at least one or each of the non-voided layers and the skin layer comprises a polymer selected from the group consisting of homo-, co-, and terpolymer containing ethylene, propylene, and/or butylene.

8. The oriented film of claim 1 further comprises at least one heat sealable layer on the outermost surface of the film structure.

* * * * *